US011967474B2

(12) United States Patent
Aoyama et al.

(10) Patent No.: US 11,967,474 B2
(45) Date of Patent: Apr. 23, 2024

(54) OPERATION DEVICE

(71) Applicant: KABUSHIKI KAISHA TOKAI RIKA DENKI SEISAKUSHO, Aichi (JP)

(72) Inventors: Yutaka Aoyama, Aichi (JP); Yusuke Usui, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 252 days.

(21) Appl. No.: 17/768,559

(22) PCT Filed: Sep. 25, 2020

(86) PCT No.: PCT/JP2020/036466
§ 371 (c)(1),
(2) Date: Apr. 13, 2022

(87) PCT Pub. No.: WO2021/075238
PCT Pub. Date: Apr. 22, 2021

(65) Prior Publication Data
US 2023/0063651 A1 Mar. 2, 2023

(30) Foreign Application Priority Data
Oct. 15, 2019 (JP) ................................ 2019-188516

(51) Int. Cl.
*H01H 21/22* (2006.01)

(52) U.S. Cl.
CPC ....... *H01H 21/22* (2013.01); *H01H 2021/225* (2013.01); *H01H 2239/006* (2013.01)

(58) Field of Classification Search
CPC ............... H03K 17/962; H03K 17/975; H03K 17/9622; H03K 2217/960755;
(Continued)

(56) References Cited

U.S. PATENT DOCUMENTS 10,790,100 B1 * 9/2020 R ........................... B60K 35/00
2020/0280314 A1 * 9/2020 Adachi .................. E05F 15/00
(Continued)

FOREIGN PATENT DOCUMENTS

JP 2005-108621 A 4/2005

*Primary Examiner* — Ahmed M Saeed
(74) *Attorney, Agent, or Firm* — Studebaker & Brackett PC

(57) ABSTRACT

An operation device includes an operation knob that is operable by a pull-up operation and a push-down operation about a shaft and includes a front-end operation region on a front-end side far from the shaft and a rear-end operation region on a rear end side close to the shaft, a contact detection unit to detect contact of a user with the front-end operation region and the rear-end operation region, an operation detection unit to detect the pull-up operation and the push-down operation performed on the operation knob, and a determination unit that determines an operation performed by combining contact with the front-end operation region and the rear-end operation region detected by the contact detection unit and the pull-up operation and the push-down operation detected by the operation detection unit, and also determines that at least an operation performed on the rear-end operation region is invalid when the contact is detected.

10 Claims, 8 Drawing Sheets

(58) Field of Classification Search
CPC ............. H03K 17/96; H01H 2239/006; H01H 2300/01; H01H 2003/0293; H01H 2021/225; H01H 21/22; H01H 2239/074; H01H 2221/016; H01H 13/14
See application file for complete search history.

(56) References Cited

U.S. PATENT DOCUMENTS

| | | | | |
|---|---|---|---|---|
| 2021/0143818 | A1* | 5/2021 | Carvalho | B60R 16/0231 |
| 2021/0194483 | A1* | 6/2021 | Cannon | G06F 3/017 |
| 2021/0247945 | A1* | 8/2021 | Goto | H03K 17/9622 |
| 2022/0154517 | A1* | 5/2022 | Ito | B60R 16/005 |

* cited by examiner

OPERATION DEVICE

CROSS-REFERENCES TO RELATED APPLICATIONS

The present patent application claims the priority of Japanese patent application No. 2019/188516 filed on Oct. 15, 2019, and the entire contents of Japanese patent application No. 2019/188516 are hereby incorporated by reference.

TECHNICAL FIELD

The present invention relates to an operation device.

BACKGROUND ART

A power window switch to open and close vehicle windows is known (see, e.g., Patent Literature 1).

This power window switch has plural switch buttons attached to a switch box via support shafts so that front ends can be operated and pivoted up and down. The switch button has switch portions at the front end and the rear end and is configured such that the switch portion on the front-end side is turned on when the front end is operated and pivoted in a downward direction, and the switch portion on the rear end side is turned on when the front end is operated and pivoted in an upward direction.

CITATION LIST

Patent Literature

Patent Literature 1: JP 2005/108621 A

SUMMARY OF INVENTION

Technical Problem

When, e.g., the power window switch disclosed in Patent Literature 1 is configured to be capable of instructing to open and close front and rear seat windows by one switch button instead of by the plural switch buttons and is also configured to detect contact with regions set on the front seat side and the rear seat side, and if the user tries to operate the front seat side region of the switch button and touches also the rear seat side region, an erroneous determination to cause unintended windows to be opened or closed may occur.

It is an object of the invention to provide an operation device that can suppress erroneous determination against intention of a user.

Solution to Problem

An operation device in an embodiment of the invention comprises:

- an operation knob that is operable by a pull-up operation and a push-down operation about a shaft and comprises a front-end operation region on a front-end side far from the shaft and a rear-end operation region on a rear end side close to the shaft;
- a contact detection unit to detect contact of a user with the front-end operation region and the rear-end operation region;
- an operation detection unit to detect the pull-up operation and the push-down operation performed on the operation knob; and

- a determination unit that determines an operation performed by combining contact with the front-end operation region and the rear-end operation region detected by the contact detection unit and the pull-up operation and the push-down operation detected by the operation detection unit, and also determines that at least an operation performed on the rear-end operation region is invalid when contact with the front-end operation region and the rear-end operation region is detected.

Advantageous Effects of Invention

According to an embodiment of the invention, an operation device can be provided that can suppress erroneous determination against intention of a user.

DESCRIPTION OF EMBODIMENTS

Summary of the Embodiments

An operation device in an embodiment has an operation knob that is operable by a pull-up operation and a push-down operation about a shaft and has a front-end operation region on a front end side far from the shaft and a rear-end operation region on a rear end side closer to the shaft, a contact detection unit to detect contact of a user with the front-end operation region and the rear-end operation region, an operation detection unit to detect the pull-up operation and the push-down operation performed on the operation knob, and a determination unit that determines an operation performed by combining contact with the front-end operation region and the rear-end operation region detected by the contact detection unit and the pull-up operation and the push-down operation detected by the operation detection unit, and also determines that at least an operation performed on the rear-end operation region is invalid when contact with the front-end operation region and the rear-end operation region is detected.

The operation device assumes that a user could accidentally touch the rear-end operation region 23 at the time of operating the front-end operation region, and it is configured such that when contact with the front-end operation region and the rear-end operation region is detected, at least an operation performed on the rear-end operation region is determined to be invalid. Therefore, it is possible to suppress erroneous determination against intention of a user, as compared to when the operations on both regions are determined to be valid.

Embodiment (General Configuration of an Operation Device 1)

Figure 1A:
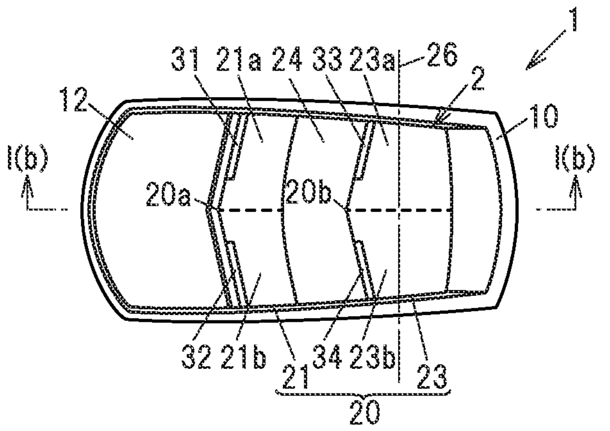
FIG. 1A is a top view showing an operation device in an embodiment.
Figure 1B:
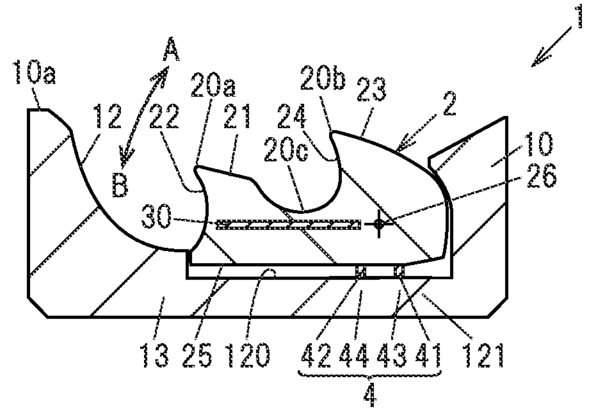
FIG. 1B is a cross-sectional view when a cross section cut along line I(b)-I(b) of FIG. 1A is viewed in a direction of arrow.
Figure 1C:
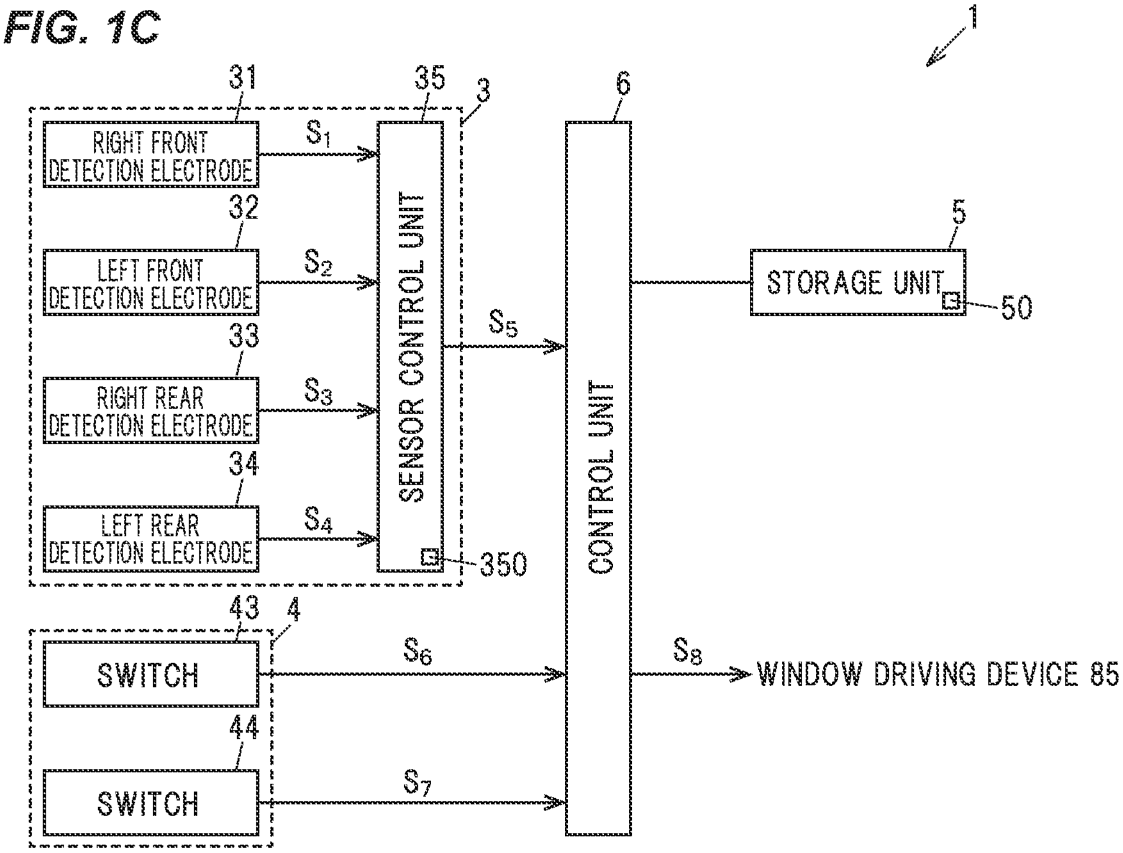
FIG. 1C is a block diagram illustrating the operation device in the embodiment.
Figure 2A:
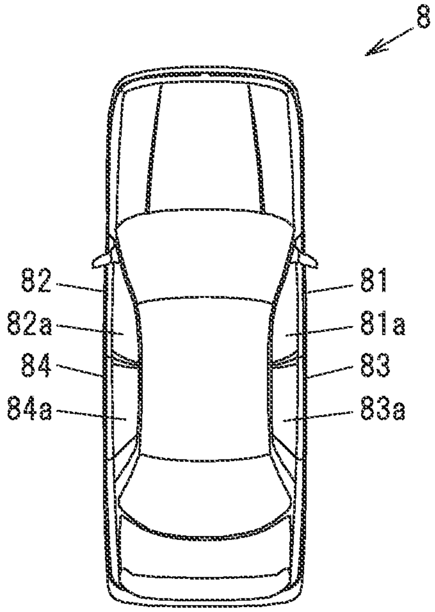
FIG. 2A is a top view showing a vehicle on which the operation device in the embodiment is mounted.
Figure 2B:
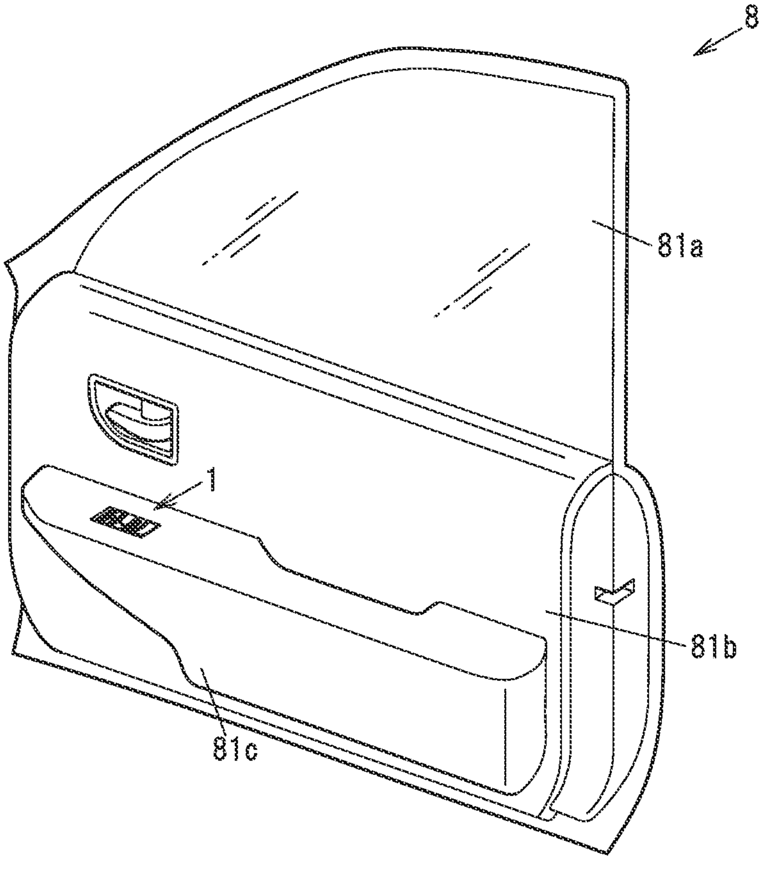
FIG. 2B is an explanatory diagram illustrating a door for explaining a position of the operation device in the embodiment.

FIG. 1A is a top view showing an operation device, FIG. 1B is a cross-sectional view when a cross section cut along line I(b)-I(b) of FIG. 1A is viewed in a direction of arrow, and FIG. 1C is a block diagram illustrating the operation device. FIG. 2A is a top view showing a vehicle on which the operation device is mounted, and FIG. 2B is an explanatory diagram illustrating a door for explaining a position of the operation device. In each drawing of the embodiment described below, a scale ratio may be different from an actual ratio. In addition, in FIG. 1C, flows of main signals are indicated by arrows.

As shown in FIGS. 1A to 1C, an operation device 1 has an operation knob 2 that is operable by a pull-up operation and a push-down operation about a shaft 26 and has a front-end operation region 21 on a front end side far from the shaft 26 and a rear-end operation region 23 on a rear end side close to the shaft 26, a contact detection unit 3 to detect contact of a user with the front-end operation region 21 and the rear-end operation region 23, an operation detection unit 4 to detect the pull-up operation and the push-down operation performed on the operation knob 2, and a control unit 6 as the determination unit that determines an operation performed by combining contact with the front-end operation region 21 and the rear-end operation region 23 detected by the contact detection unit 3 and the pull-up operation and the push-down operation detected by the operation detection unit 4, and also determines that at least an operation performed on the rear-end operation region 23 is invalid when contact with the front-end operation region 21 and the rear-end operation region 23 is detected.

As an example, the operation device 1 in the present embodiment is arranged in a four-door vehicle 8, as shown in FIGS. 2A and 2B. In more particular, the operation device 1 is arranged on an armrest 81*c* attached to a door trim 81*b* of a driver's side door 81 of the vehicle 8, as shown in FIG. 2B. The operation device 1 is configured be capable of instructing a window driving device 85 to open and close windows 81*a* to 84*a* on doors 81 to 84. The operation device 1 may be arranged on a door other than the driver's side or may be arranged in a two-door vehicle.

(Configuration of the Operation Knob 2)

Figure 3A:
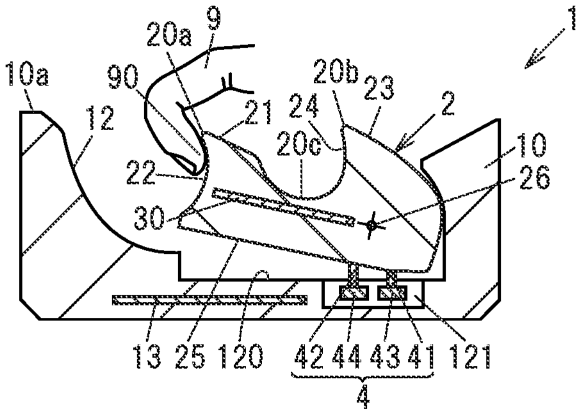
FIG. 3A is an explanatory diagram illustrating a pull-up operation on an operation knob in the embodiment.
Figure 3B:
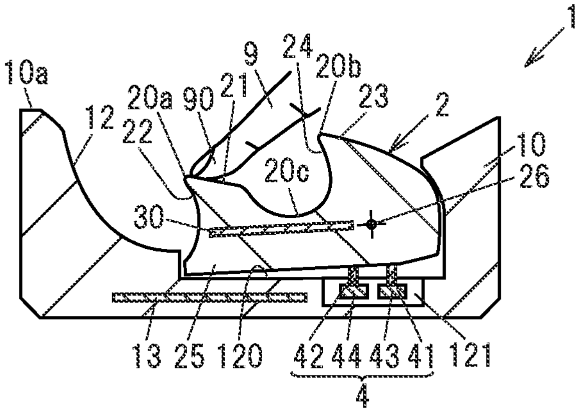
FIG. 3B is an explanatory diagram illustrating a push-down operation on the operation knob in the embodiment.
Figure 3C:
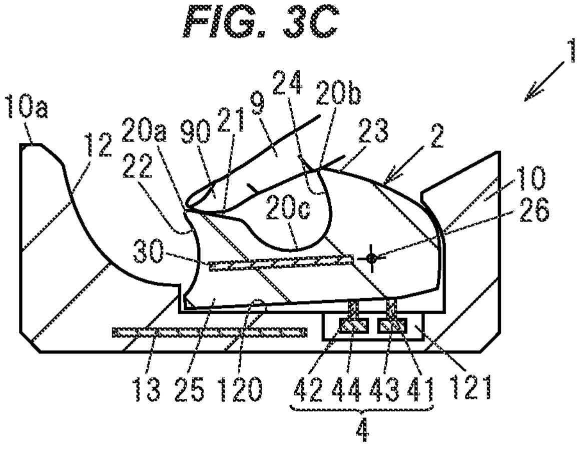
FIG. 3C is an explanatory diagram for explaining an operation performed on the operation knob in the embodiment in such a manner that a front-end operation region and a rear-end operation region are simultaneously touched.

FIG. 3A is an explanatory diagram illustrating a pull-up operation on the operation knob, FIG. 3B is an explanatory diagram illustrating a push-down operation on the operation knob, and FIG. 3C is an explanatory diagram for explaining an operation performed in such a manner that the front-end operation region and the rear-end operation region are simultaneously touched.

The operation knob 2 is arranged in a recessed portion 12 of a main body 10, as shown in FIGS. 3A to 3C. The recessed portion 12 has a curved surface so that an operation finger 9 of a user is guided downward from an upper surface 10*a* of the main body 10. As shown in FIGS. 3A to 3C, the operation knob 2 is attached to the main body 10 so as to rotate inside the recessed portion 12 in an arrow A direction and an arrow B direction about a shaft 26. The arrow A direction is a direction in which the operation knob 2 is pulled up. The arrow B direction is a direction in which the operation knob 2 is pushed down.

The operation knob 2 is formed of a resin material. The operation knob 2 has a groove 24 on a surface 20, and the surface 20 is divided at the groove 24 into the front-end operation region 21 on a front-end side far from the shaft 26 and the rear-end operation region 23 on a rear end side close to the shaft 26.

As shown in FIG. 1A, the groove 24 when viewed from above is formed to have a curved shape rather than a linear shape. In addition, as shown in FIG. 1B, the groove 24 when viewed in a cross section cut along line I(b)-I(b) is curved from a rear end of the front-end operation region 21 to a vertex 20*b* of the rear-end operation region 23. The shape of the groove 24 from the vertex 20*b* to a lower surface 20*c* allows the user to easily perform a pull-up operation by hooking the operation finger.

As shown in FIGS. 3A to 3C, the operation knob 2 also has a side surface 22 having a shape curved from a vertex 20*a* on the front side toward a lower surface 25 of the operation knob 2. The side surface 22 has a shape which is recessed toward the inside of the operation knob 2, from the vertex 20*a* toward the rear end. The shape of the side surface 22 also allows the user to easily perform a pull-up operation by hooking the operation finger, in the same manner as the groove 24.

Furthermore, the operation knob 2 has such a shape that the vertex 20*b* is located higher than the vertex 20*a*, as shown in FIG. 1B.

The front-end operation region 21 is a region to operate the window 81*a* of the right front door 81 and the window 82*a* of the left front door 82. The rear-end operation region 23 is a region to operate the window 83*a* of the right rear door 83 and the window 84*a* of the left rear door 84.

Furthermore, the front-end operation region 21 has a first operation region 21*a* and a second operation region 21*b* to instruct to open and close the right front window 81*a* and the left front window 82*a* of the vehicle 8. Likewise, the rear-end operation region 23 has a third operation region 23*a* and a fourth operation region 23*b* to instruct to open and close the right rear window 83*a* and the left rear window 84*a* of the vehicle 8.

The first operation region 21*a* is a region on the upper side of a dotted line drawn at the center of the front-end operation region 21 in FIG. 1A and further includes a region of the side surface 22 on the right side of the vertex 20*a*. The second operation region 21*b* is a region on the lower side of the dotted line drawn at the center of the front-end operation region 21 in FIG. 1A and further includes a region of the side surface 22 on the left side of the vertex 20*a*. That is, the first operation region 21*a* and the second operation region 21*b* are regions serving as two knobs respectively corresponding to the front seat windows 81_a_, 82_a_, and are regions which are touched at the time of a pull-up operation and a push-down operation on the respective knobs.

The third operation region 23_a_ is a region on the upper side of a dotted line drawn at the center of the rear-end operation region 23 in FIG. 1A and further includes a region up to the lower surface 20_c_ of the groove 24 on the right side of the vertex 20_b_. The fourth operation region 23_b_ is a region on the lower side of the dotted line drawn at the center of the rear-end operation region 23 in FIG. 1A and further includes a region up to the lower surface 20_c_ of the groove 24 on the left side of the vertex 20_b_. That is, the third operation region 23_a_ and the fourth operation region 23_b_ are regions serving as two knobs respectively corresponding to the rear seat windows 83_a_, 84_a_, and are regions which are touched at the time of a pull-up operation and a push-down operation on the respective knobs.

Since the operation knob 2 has the first to fourth operation regions 21_a_ to 23_b_ as described above, the four windows 81_a_ to 84_a_ can be operated by one knob and the size is small.

(Configuration of the Contact Detection Unit 3)

The contact detection unit 3 in the present embodiment is a capacitive touch sensor that detects proximity or contact of a detection target to/with the first to fourth operation regions 21_a_ to 23_b_ of the operation knob 2.

In particular, as shown in FIGS. 1A to 1C, the contact detection unit 3 has first to fourth detection electrodes (=a right front detection electrode 31 to a left rear detection electrode 34) that are arranged in the first to fourth operation regions 21_a_ to 23_b_, and a sensor control unit 35 as a contact determination unit that determines proximity and contact of the detection target based on output signals (=first to fourth output signals $S_1$ to $S_4$) acquired from the right front detection electrode 31 to the left rear detection electrode 34. The sensor control unit 35 is arranged on a sub-substrate 30. The sub-substrate 30 is arranged in the operation knob 2. The detection target is the operation finger of the user.

The right front detection electrode 31 to the left rear detection electrode 34 are formed of a conductive metal material. The right front detection electrode 31 to the left rear detection electrode 34 are arranged on the operation knob 2 at a boundary between the surface 20 and the side surface 22 and a boundary between the surface 20 and the groove 24, i.e., at the corners on both sides of the vertex 20_a_ and the vertex 20_b_. In addition, the right front detection electrode 31 to the left rear detection electrode 34 are exposed on the surface 20, the side surface 22 and the groove 24 to detect contact with the surface 20 as well as contact with the side surface 22 and the groove 24.

The right front detection electrode 31 to the left rear detection electrode 34 have a long shape as shown in FIG. 1A, but it is not limited thereto as long as it is a shape capable of detecting proximity and contact of the operation finger to/with the first to fourth operation regions 21_a_ to 23_b_. The right front detection electrode 31 to the left rear detection electrode 34 are also decorative components to decorate the operation knob 2.

The sensor control unit 35 is a microcomputer composed of a CPU (=Central Processing Unit) performing calculation and processing, etc., of the acquired data according to a stored program, and a RAM (=Random Access Memory) and a ROM (=Read Only Memory) as semiconductor memories, etc. The ROM stores a program for operation of the sensor control unit 35. The RAM is used as a storage area to temporarily store calculation results, etc. The sensor control unit 35 also has, inside thereof, a means to generate a clock signal and operates based on the clock signal. This clock signal is synchronized with the control unit 6.

The sensor control unit 35 is, e.g., an electrostatic sensor IC (=Integrated Circuit). The contact detection unit 3 is configured as a self-capacitance type touch sensor in which capacitance increases when the operation finger of the user comes in proximity or contact with the right front detection electrode 31 to the left rear detection electrode 34. The sensor control unit 35 has an electrostatic threshold value 350 in the RAM or the ROM and determines that there is proximity or contact of the operation finger of the user when capacitance of not less than the electrostatic threshold value 350 is detected. In this regard, the contact detection unit 3 is not limited to the self-capacitance type touch sensor and may be a mutual-capacitance type touch sensor or another type of touch sensor.

The first to fourth output signals $S_1$ to $S_4$ acquired by the sensor control unit 35 from the right front detection electrode 31 to the left rear detection electrode 34 are analog signals. The sensor control unit 35 determines whether or not there is proximity or contact for each of the right front detection electrode 31 to the left rear detection electrode 34, and outputs the result as a detection signal $S_5$ to the electrically connected control unit 6. The detection signal $S_5$ is a digital signal. The sensor control unit 35 is connected to the control unit 6 by a flexible cable.

The sensor control unit 35 is mounted on the sub-substrate 30 (shown in FIG. 1B) which is arranged in the operation knob 2. The sub-substrate 30 is a printed circuit board on which wiring and electrode pads, etc., are provided. The right front detection electrode 31 to the left rear detection electrode 34 are electrically connected to the sensor control unit 35 via the electrode pads or wiring formed on the sub-substrate 30.

Since the contact detection unit 3 is arranged on the operation knob 2 and sends the detection result to the main body 10 side using digital signals instead of analog signals, it is less likely to be affected by external noise as compared to when sending analog signals. As a result, the operation device 1 has high accuracy in detecting the operation finger of the user.

The contact detection unit 3 is not limited to the touch sensor and may be a pressure sensor, etc., that detects contact with the operation knob 2, as a modification.

Here, the sensor control unit 35 takes a time of at least about 30 ms to detect the operation finger, as an example. This time involves A/D conversion of electrode voltage, a correction process for the detection electrodes to improve accuracy of capacitance detection, measurement of a reference value of capacitance, a process to calculate a difference value between the reference value of capacitance and a current capacitance value and confirm the capacitance value, and time for data transmission, etc.

Thus, at the time of determining a control pattern (described later), the control unit 6 does not determine it at the time the switch is turned "ON", but determines it with a delay after the switch is turned "ON", by taking into consideration the delay in the processing of the contact detection unit 3. This delay is not less than time required to confirm detection, as an example. In consideration of this delay, the time at which determination is made will be described as the time at which "ON" of the switch is confirmed, etc., in the following description.

(Configuration of the Operation Detection Unit 4)

As shown in FIG. 1B, the operation detection unit 4 has a rod 41, a rod 42, a switch 43 and a switch 44. The rod 41 and the rod 42 are in contact with protrusions provided inside the operation knob 2 and are also in contact with the switch 43 and the switch 44. The switch 43 and the switch 44 are configured to be turned into a first ON state and a second ON state via the rod 41 and the rod 42 by a pull-up operation and a push-down operation performed on the operation knob 2.

Each of the switch 43 and the switch 44 is composed of two switches, as an example. As shown in FIG. 1B, the switch 43 and the switch 44 are arranged in an arrangement recess 121 provided on a bottom surface 120 of the recessed portion 12 of the main body 10.

When the operation knob 2 is pulled up, a first switch of the switch 43 is firstly turned into the ON state (the first ON state). When the operation knob 2 is further pulled up, the first switch and a second switch of the switch 43 are turned into the ON state (the second ON state). Likewise, when the operation knob 2 is pushed down, a first switch of the switch 44 is firstly turned into the ON state (the first ON state). When the operation knob 2 is further pushed down, the first switch and a second switch of the switch 44 are turned into the ON state (the second ON state).

A mode when the operation knob 2 is pulled up and the switch 43 is turned to the first ON state is a manual mode in which the window is driven in a closing direction. A mode when the operation knob 2 is further pulled up and the switch 43 is turned to the second ON state is an automatic mode in which the window is driven until fully closed.

A mode when the operation knob 2 is pushed down and the switch 44 is turned to the first ON state is the manual mode in which the window is driven in an opening direction. A mode when the operation knob 2 is further pushed down and the switch 44 is turned to the second ON state is the automatic mode in which the window is driven until fully opened.

The operation detection unit 4, when detected pulling-up of the operation knob 2, outputs a switch signal $S_6$ corresponding to the ON state from the switch 43 to the electrically connected control unit 6. Meanwhile, the operation detection unit 4, when detected pushing-down of the operation knob 2, outputs a switch signal $S_7$ corresponding to the ON state from the switch 44 to the electrically connected control unit 6.

(Configuration of a Storage Unit 5)

A storage unit 5 is electrically connected to the control unit 6. The storage unit 5 may be an external storage device connected outside the control unit 6, or may be a RAM of the control unit 6 or a semiconductor memory provided on a main substrate 13.

The storage unit 5 stores control pattern information 50 to determine a driving direction and a window to be driven, by a combination of an operation region in which an operation is detected by the contact detection unit 3 and a pull-up operation and a push-down operation detected by the operation detection unit 4.

The control pattern information 50 is information of control patterns in which "ON" and "OFF" timings of the right front detection electrode 31 to the left rear detection electrode 34 and the switches 43, 44, an operation signal $S_8$ to be output, and validity or invalidity of the operation are combined. Control patterns, which are based on the control pattern information 50 and are about the "ON" and "OFF" timings of the detection electrodes and the switches, the operation signal output at such timings, and validity or invalidity of the operation, will be described in FIGS. 4A to 7B described later.

(Configuration of the Control Unit 6)

The control unit 6 is a microcomputer composed of a CPU performing calculation and processing, etc., of the acquired data according to a stored program, and a RAM and a ROM as semiconductor memories, etc. The ROM stores a program for operation of the control unit 6. The RAM is used as a storage area to temporarily store calculation results, etc. The control unit 6 also has, inside thereof, a means to generate a clock signal and operates based on the clock signal.

The control unit 6 generates the operation signal $S_8$ based on the determined control pattern, and outputs it to the window driving device 85 that drives windows in an opening direction and a closing direction. In consideration of the delay of confirmation of detection of the operation finger, the control unit 6 determines the control pattern at the time "ON" of the switch is confirmed, as described above. In this regard, the window driving device 85 is configured to stop driving without instruction from the operation device 1 once the window is fully opened and fully closed.

Next, control patterns based on the "ON" and "OFF" timings will be described with reference to the drawings in FIGS. 4A to 7B. The waveforms of the right front detection electrode 31 to the left rear detection electrode 34 in FIGS. 4A to 7B represent the detection signal $S_5$ which is shown as individual signals from the detection electrodes, for the purpose of explanation. The waveforms of the (pull-up side) switch 43 and the (push-down side) switch 44 indicate the switch signal $S_6$ and the switch signal $S_7$. The operation signal $S_8$ is shown by waveforms of separate operation signals $S_{8a}$-$S_{8d}$ to instruct to open or close the windows 81$a$-84$a$, for the purpose of explanation.

The horizontal axis in FIGS. 4A to 7B is time, with numbers in accordance with the lapse of time. Time of rise of "ON" of the switch (=$t_2$, $t_{12}$, $t_{21}$, $t_{30}$, $t_{42}$, $t_{52}$, $t_{61}$, $t_{71}$) is the time at which "ON" is confirmed, i.e., the time at which determination is made. In a precise sense, the operation signal is sent after the determination is confirmed. However, since the time interval from the time "ON" is confirmed described above is small, it is described as being sent from the time "ON" is confirmed.

"ON" and "OFF" of the right front detection electrode 31 to the left rear detection electrode 34 indicate detection and no detection of the operation finger. "ON" and "OFF" of the (pull-up side) switch 43 and the (push-down side) switch 44 indicate detection and no detection of a pull-up operation and a push-down operation. The manual mode will be described here, but the same applies to the automatic mode. In addition, "ON" and "OFF" of the operation signal $S_8$ indicate an instruction to drive and no instruction.

(Control Patterns)

First Control Pattern

Figure 4A:
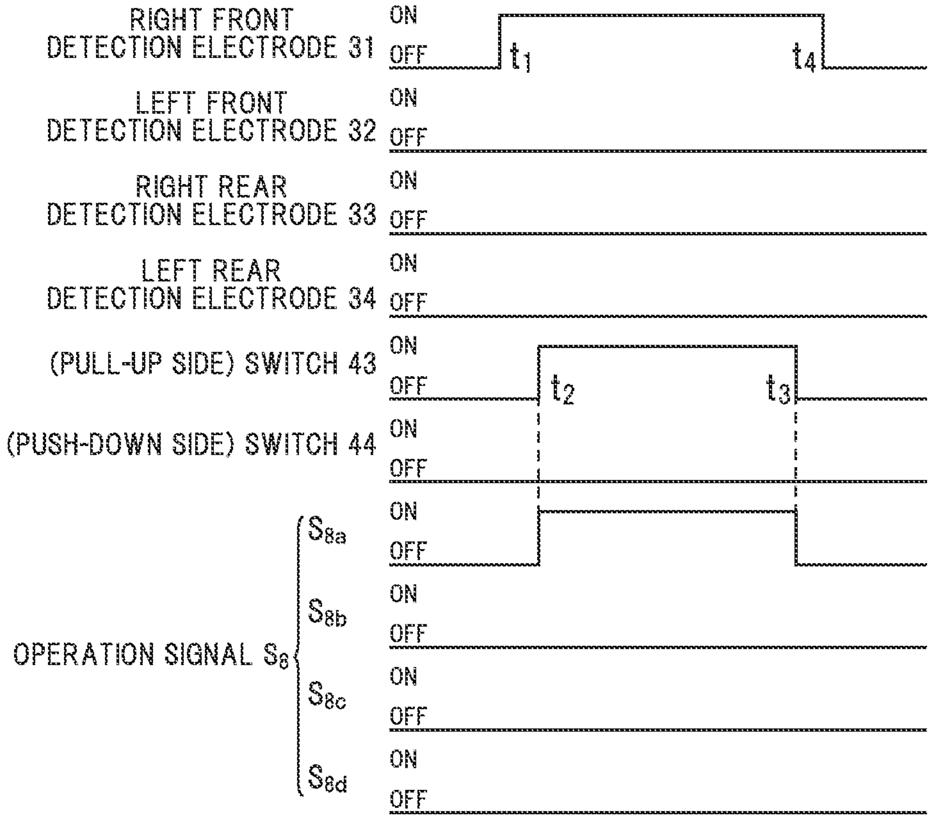
FIG. 4A is an explanatory diagram illustrating a first control pattern of the operation device in the embodiment.

FIG. 4A shows an example of the first control pattern to drive a window corresponding to the detection electrode which is "ON" at the time "ON" of the switch is confirmed.

In FIG. 4A, the right front detection electrode 31 is "ON" from time $t_1$ to time $t_4$, and the pull-up side switch 43 is "ON" from time $t_2$ to time $t_3$. FIG. 4A shows a normal single operation where contact is detected first and the switch is subsequently turned "ON" by an operation performed on the operation knob 2, and then, the switch is turned "OFF" by ending the operation and the contact subsequently stops being detected.

That is, when there is a detection electrode that is "ON" at the time "ON" of the switch 43 or the switch 44 is confirmed, the control unit 6 outputs the operation signal $S_8$ to drive a window corresponding to this detection electrode.

Once acquiring the detection signal $S_5$ indicating that the right front detection electrode 31 is turned "ON" and the switch signal $S_6$ indicating that the pull-up side switch 43 is turned "ON", the control unit 6 determines, based on the control pattern information 50, that the operation to close the window 81*a* is valid.

The control unit 6 starts outputting the operation signal $S_{8a}$ to close the window 81*a* at the time $t_2$. Then, since the switch 43 is turned "OFF" before the right front detection electrode 31 is turned "OFF", the control unit 6 stops outputting the operation signal $S_{8a}$ at the time $t_3$ at which the switch 43 is turned "OFF".

In the case of the first control pattern in the manual mode, the control unit 6 keeps outputting the operation signal $S_8$ while the switch is "ON". Meanwhile, in the automatic mode, the control unit 6 outputs the operation signal $S_8$ to instruct to fully open or fully close, based on time at which the automatic mode is determined.

Second Control Pattern

Figure 4B:
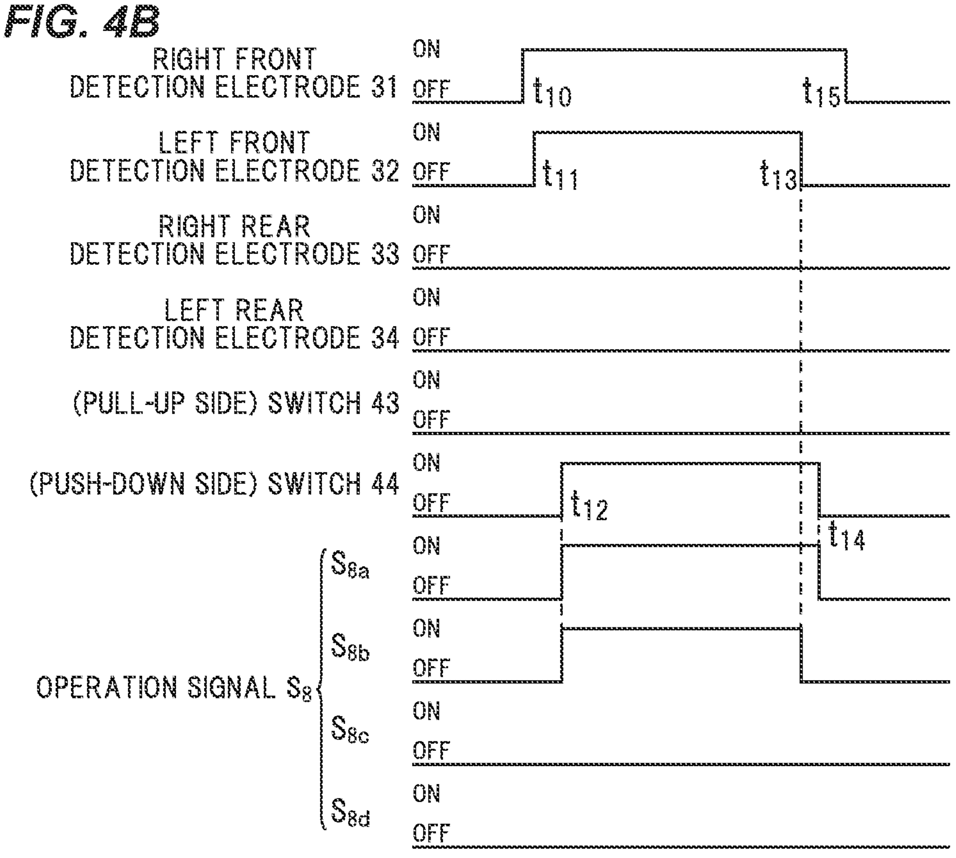
FIG. 4B is an explanatory diagram illustrating a second control pattern of the operation device in the embodiment.

FIG. 4B shows an example of the second control pattern to drive plural windows corresponding to plural detection electrodes of the front-end operation region 21 or the rear-end operation region 23 which are "ON" at the time "ON" of the switch is confirmed.

In FIG. 4B, the right front detection electrode 31 is "ON" from time $t_{10}$ to time $t_{15}$, the left front detection electrode 32 is "ON" from time $t_{11}$ to time $t_{13}$, and the push-down side switch 44 is "ON" from time $t_{12}$ to time $t_{14}$. In FIG. 4B, contact with the two detection electrodes is detected first and the switch is subsequently turned "ON", and then, after the contact with one of the detection electrodes stops being detected, the switch is turned "OFF" by ending the operation and the contact with the other detection electrode subsequently stopes being detected.

That is, when plural detection electrodes of the front-end operation region 21 or the rear-end operation region 23 are "ON" at the time "ON" of the switch 43 or the switch 44 is confirmed, the control unit 6 outputs the operation signal $S_8$ to drive windows corresponding to these plural detection electrodes. The control unit 6 also stops driving the window corresponding to the detection electrode which no longer detects the operation finger, among the plural detection electrodes which are detecting the operation finger.

Once acquiring the detection signal $S_5$ indicating that the right front detection electrode 31 and the left front detection electrode 32 are turned "ON" and the switch signal $S_7$ indicating that the push-down side switch 44 is turned "ON", the control unit 6 determines, based on the control pattern information 50, that the operation to open the window 81*a* and the window 82*a* is valid, since the switch is turned "ON" after the operation finger is detected.

The control unit 6 starts outputting the operation signal $S_{8a}$ and the operation signal $S_{8b}$ to open the window 81*a* and the window 82*a* at the time $t_{12}$. Then, since the left front detection electrode 32 is turned "OFF" at the time $t_{13}$ before the switch 44 is turned "OFF", the control unit 6 stops outputting the operation signal $S_{8b}$. After that, since the switch 44 is turned "OFF" first at the time $t_{14}$, the control unit 6 stops outputting the operation signal $S_{8a}$ at the time $t_{14}$ at which the switch 44 is turned "OFF".

In the case of the second control pattern in the manual mode, the control unit 6 keeps outputting the operation signal $S_8$ to drive the windows corresponding to the detection electrodes of the front-end operation region 21 or the rear-end operation region 23 which detected the operation finger, during when the switch is "ON". Meanwhile, in the automatic mode, the control unit 6 outputs the operation signal $S_8$ to instruct to fully open or fully close the plural windows corresponding to the detection electrodes of the front-end operation region 21 or the rear-end operation region 23 which detected the operation finger, based on time at which the automatic mode is determined.

Third Control Pattern

Figure 5A:
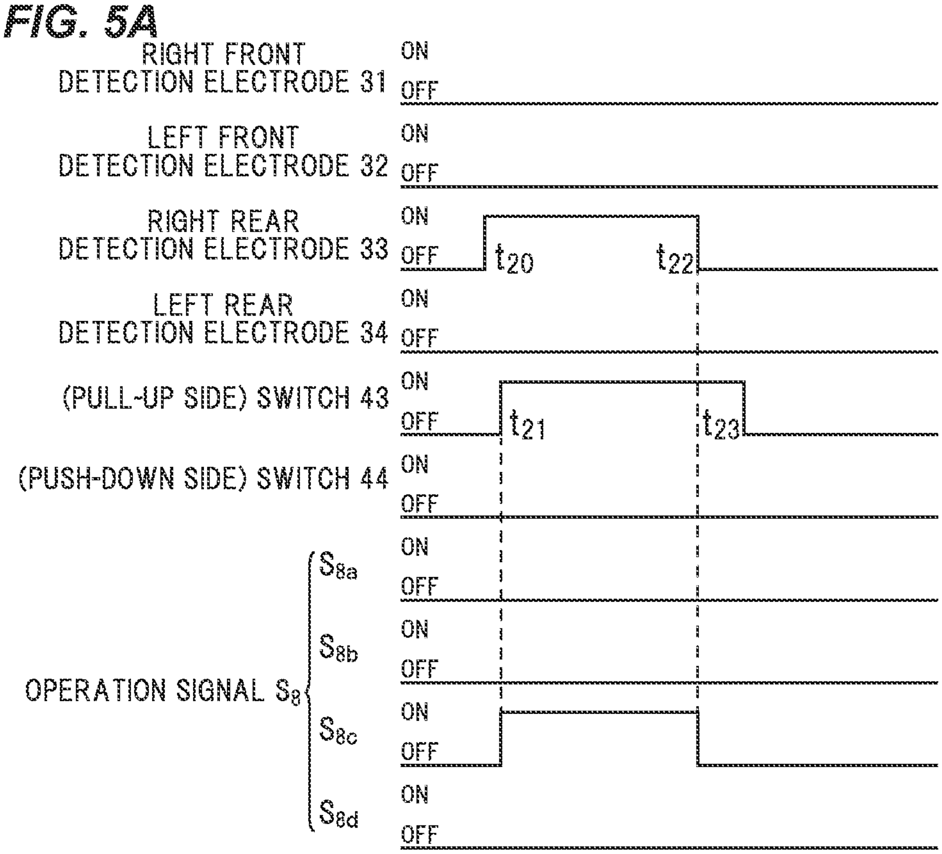
FIG. 5A is an explanatory diagram illustrating a third control pattern of the operation device in the embodiment.

FIG. 5A shows an example of the third control pattern to drive a window corresponding to the detection electrode which is "ON" at the time "ON" of the switch is confirmed, and to stop driving at the time the detection electrode is turned "OFF" first.

In FIG. 5A, the right rear detection electrode 33 is "ON" from time $t_{20}$ to time $t_{22}$, and the pull-up side switch 43 is "ON" from time $t_{21}$ to time $t_{23}$. FIG. 5A shows an example of an abnormal system where detection of the operation finger becomes "OFF" before the switch is turned "OFF".

That is, when "ON" of the switch is confirmed and after that the detection electrode is turned "OFF" before the switch is turned "OFF", the control unit 6 stops driving the window corresponding to this detection electrode.

Once acquiring the detection signal $S_5$ indicating that the right rear detection electrode 33 is turned "ON" and the switch signal $S_6$ indicating that the pull-up side switch 43 is turned "ON", the control unit 6 determines, based on the control pattern information 50, that the operation to close the rear window 83*a* on the driver's seat side is valid, since the switch is turned "ON" after the operation finger is detected.

The control unit 6 starts outputting the operation signal $S_{8c}$ to close the window 83*a* at the time $t_{21}$. Then, since the right rear detection electrode 33 is turned "OFF" before the switch 43 is turned "OFF", the control unit 6 stops outputting the operation signal $S_{8c}$ at the time $t_{22}$ at which detection becomes "OFF".

In the case of the third control pattern in the manual mode, the control unit 6 stops outputting the operation signal $S_8$ since the detection of the operation finger becomes "OFF" before the switch is turned "OFF". Meanwhile, in the automatic mode, the control unit 6 stops an output indicating that detection is "OFF", before outputting the operation signal $S_8$ to instruct to fully open or fully close based on time at which the automatic mode is determined.

Fourth Control Pattern

Figure 5B:
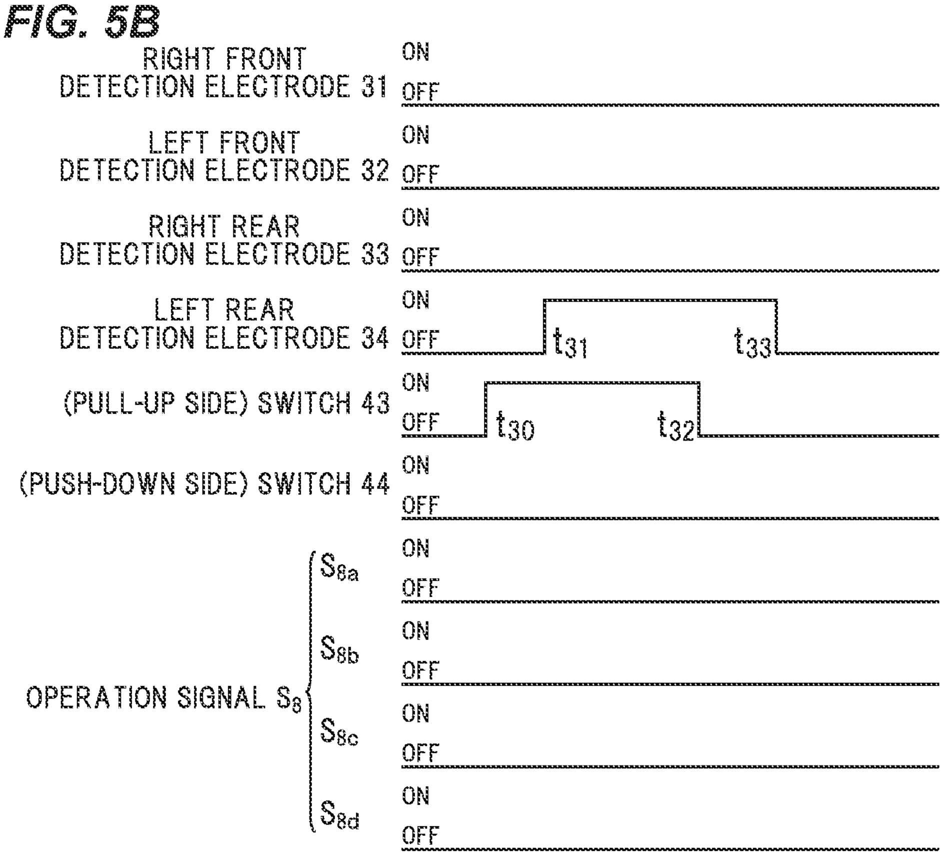
FIG. 5B is an explanatory diagram illustrating a fourth control pattern of the operation device in the embodiment.

FIG. 5B shows an example of the fourth control pattern in which the detection electrode is "OFF" at the time "ON" of the switch is confirmed.

In FIG. 5B, the pull-up side switch 43 is "ON" from time $t_{30}$ to time $t_{32}$, and the left rear detection electrode 34 is "ON" from time $t_{31}$ to time $t_{33}$. Confirmation of "ON" of the switch is made between the time $t_{30}$ and the time $t_{31}$. That is, FIG. 5B shows an example of an abnormal system where the switch is turned "ON" before the operation finger is detected, which is not because of a delay in processing.

When the switch is turned "ON" before the operation finger is detected, the control unit 6 does not drive the window corresponding to the relevant detection electrode.

When the detection electrode is "OFF" at the time "ON" of the pull-up side switch 43 is confirmed, the control unit 6 determines to not drive the window based on the control pattern information 50.

Fifth Control Pattern

When contact with the front-end operation region 21 and the rear-end operation region 23 is detected, the control unit 6 determines that a pull-up operation and a push-down operation performed on the front-end operation region 21 are valid.

Figure 6A:
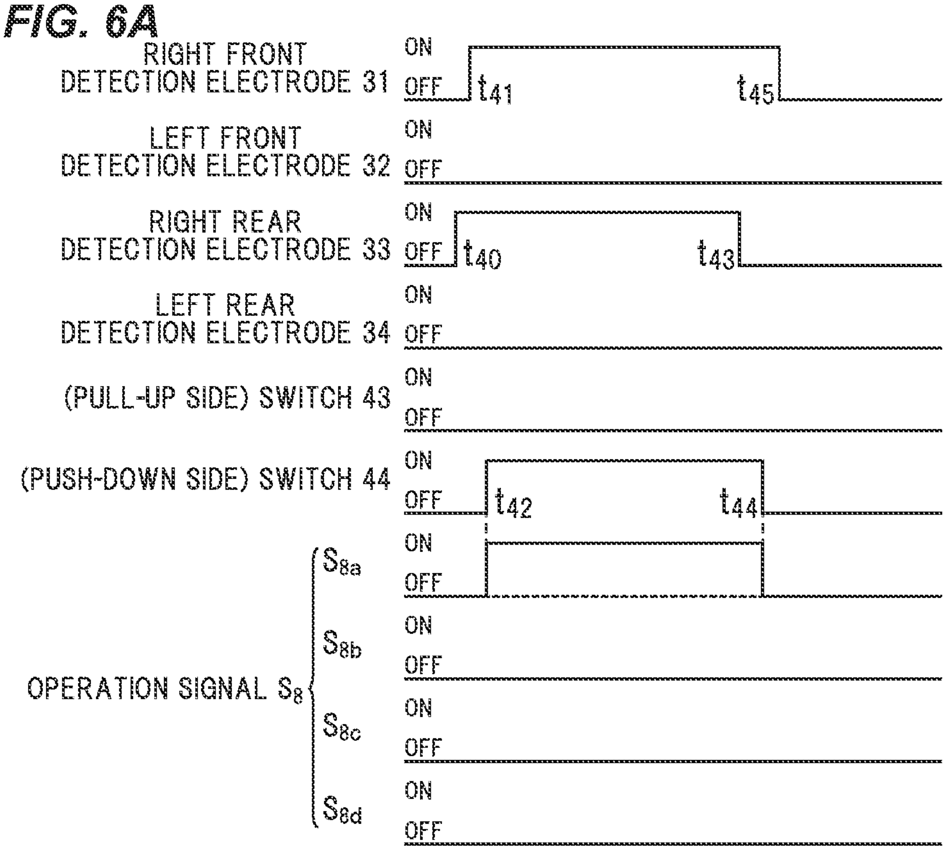
FIG. 6A is an explanatory diagram illustrating a fifth control pattern of the operation device in the embodiment.

FIG. 6A shows an example of the fifth control pattern in which the detection electrodes of the front-end operation region 21 and the rear-end operation region 23 are "ON" at the time "ON" of the switch is confirmed.

In FIG. 6A, the right rear detection electrode 33 is "ON" from time $t_{40}$ to time $t_{43}$, the right front detection electrode 31 is "ON" from time $t_{41}$ to time $t_{45}$, and the push-down side switch 44 is "ON" from time $t_{42}$ to time $t_{44}$.

FIG. 6A shows the case where the right rear detection electrode 33 corresponding to the rear window 83*a* on the driver's seat side detected the operation finger and the right front detection electrode 31 corresponding to the driver's seat window 81*a* subsequently detected the operation finger.

When the user operates the first operation region 21*a* using a fingertip 90 of the operation finger 9 as shown in FIG. 3C, a pulp portion 91 of the operation finger 9 may come into contact with the third operation region 23*a* since the operation knob 2 is small, causing the operation finger 9 to be detected by the right rear detection electrode 33. In this case, since the user does not intend to operate the third operation region 23*a*, opening or closing of the rear window 83*a* on the driver's seat side by the operation on the operation knob 2 is an unintended operation.

Thus, when contact with the front-end operation region 21 and the rear-end operation region 23 is detected, the control unit 6 determines that the operation performed on the front-end operation region 21 is valid. In FIG. 6A, since a push-down operation is performed, the control unit 6 determines that the drive to open the window 81*a* is valid and the drive to open the window 83*a* is invalid, and keeps outputting the operation signal $S_{8a}$ to drive the window 81*a* between the time $t_{42}$ and the time $t_{44}$ when the switch 44 is "ON".

In the case of the fifth control pattern in the manual mode, the control unit 6 invalidates the operation performed on the rear-end operation region 23, and outputs the operation signal $S_8$ to drive the window corresponding to the detection electrode of the front-end operation region 21 that is detecting the operating finger during when the switch is "ON".

Meanwhile, in the automatic mode, based on time at which the automatic mode is determined, the control unit 6 invalidates the operation performed on the rear-end operation region 23 and outputs the operation signal $S_8$ to instruct to fully open or fully close the window corresponding to the detection electrode of the front-end operation region 21 which detected the operating finger.

As a modification, when contact with the front-end operation region 21 and the rear-end operation region 23 is detected, the control unit 6 determines that the operations performed on the front-end operation region 21 and the rear-end operation region 23 are invalid.

In this modification, even when the detection electrodes of the front-end operation region 21 and the rear-end operation region 23 are turned "ON", the control unit 6 does not output the operation signal $S_{8a}$ as indicated by a dotted line in FIG. 6A.

Sixth Control Pattern

Figure 6B:
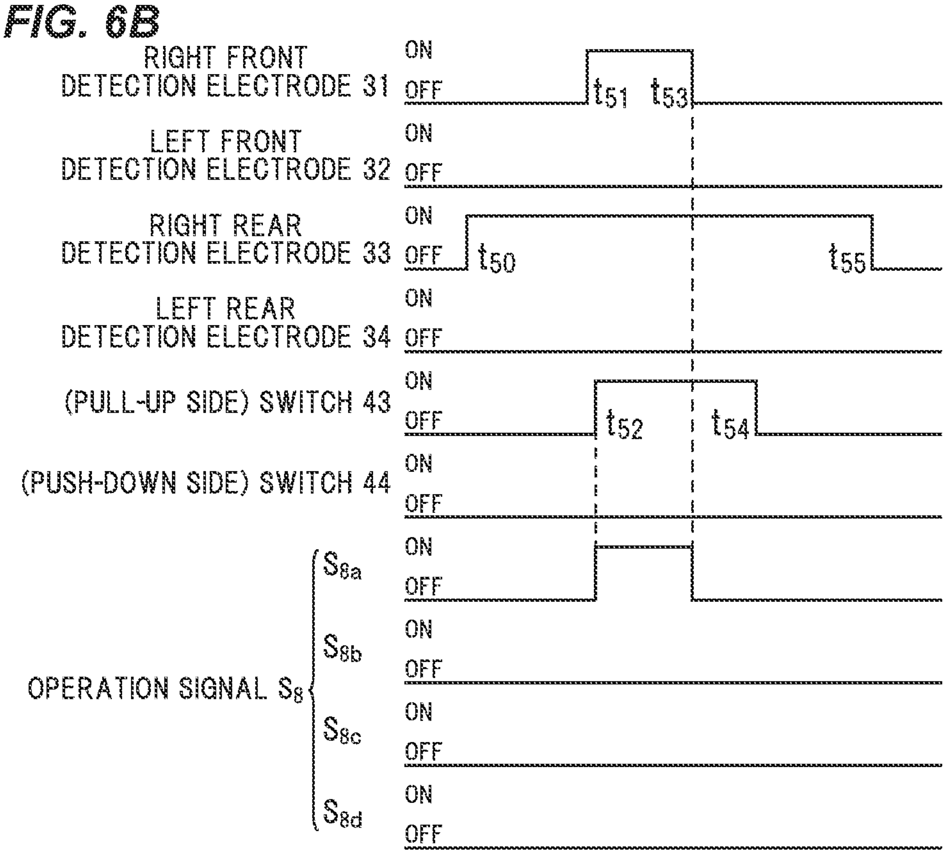
FIG. 6B is an explanatory diagram illustrating a sixth control pattern of the operation device in the embodiment.

FIG. 6B shows an example of the sixth control pattern in which, after the front-end operation region 21 is given priority, the detection electrode of the front-end operation region 21 is turned from "ON" to "OFF".

In FIG. 6B, the right rear detection electrode 33 is "ON" from time $t_{50}$ to time $t_{55}$, the right front detection electrode 31 is "ON" from time $t_{51}$ to time $t_{53}$, and the pull-up side switch 43 is "ON" from time $t_{52}$ to time $t_{54}$.

FIG. 6B shows a case where the right front detection electrode 31 and the right rear detection electrode 33 are "ON" at the time "ON" of the switch is confirmed.

When contact with the front-end operation region 21 and the rear-end operation region 23 has been detected at the time "ON" of the switch is confirmed, the control unit 6 determines that the operation performed on the front-end operation region 21 is valid. In FIG. 6B, since the pull-up operation is performed, the control unit 6 determines that the drive to open the window 81*a* is valid.

In FIG. 6B, the right front detection electrode 31 is turned "OFF" before the switch 43 is turned "OFF". Based on the control pattern information 50, the control unit 6 outputs the operation signal $S_{8a}$ to close window 81*a* from the time $t_{52}$ at which the switch 43 is turned "ON" to the time $t_{53}$ at which right front detection electrode 31 is turned "OFF". Here, the right rear detection electrode 33 is continuously "ON". However, the control unit 6 does not drive the window 83*a* since it has determined that the operation to close the window 83*a* is invalid.

In the case of the sixth control pattern in the manual mode, the control unit 6 invalidates the operation performed on the rear-end operation region 23, and outputs the operation signal $S_8$ to drive the window corresponding to the detection electrode of the front-end operation region 21 which is detecting the operating finger during when the switch is "ON" or during when the detection electrode of the front-end operation region 21 is "ON". Meanwhile, in the automatic mode, based on time at which the automatic mode is determined, the control unit 6 invalidates the operation performed on the rear-end operation region 23 and outputs the operation signal $S_8$ to instruct to fully open or fully close the window corresponding to the detection electrode of the front-end operation region 21 which detected the operating finger.

Seventh Control Pattern

Figure 7A:
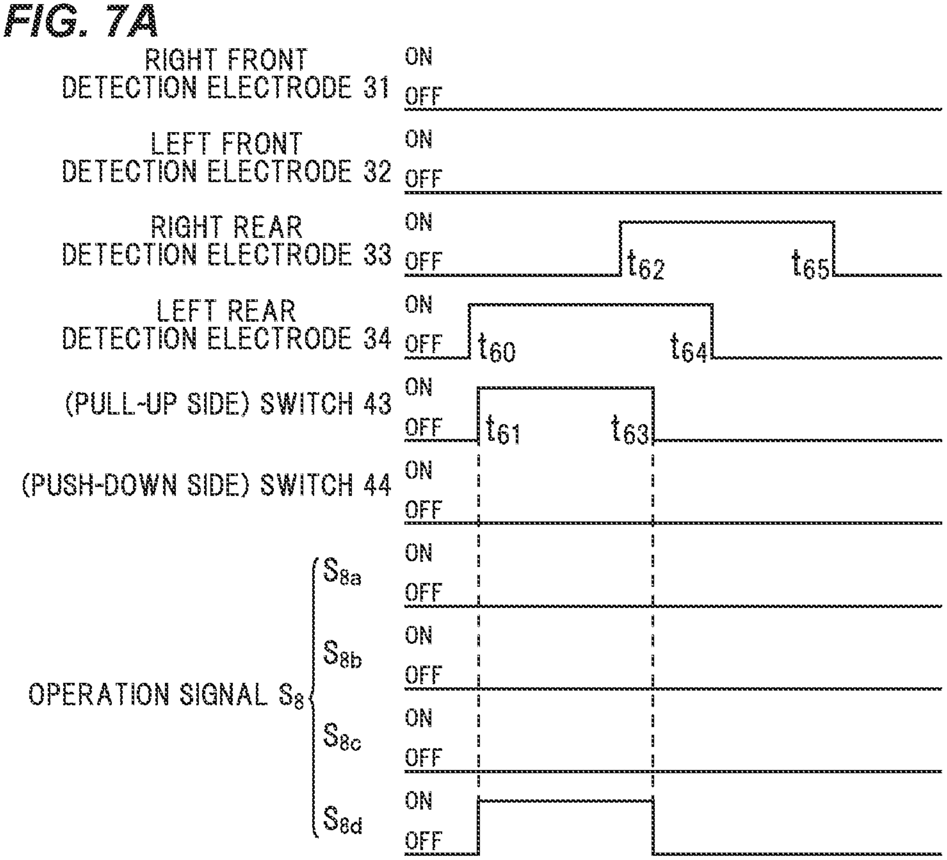
FIG. 7A is an explanatory diagram illustrating a seventh control pattern of the operation device in the embodiment.

FIG. 7A shows an example of the seventh control pattern in which another detection electrode is turned "ON" during driving a window.

In FIG. 7A, the left rear detection electrode 34 is "ON" from time $t_{60}$ to time $t_{64}$, the right rear detection electrode 33 is "ON" from time $t_{62}$ to time $t_{65}$, and the pull-up side switch 43 is "ON" from time $t_{61}$ to time $t_{63}$.

FIG. 7A shows the case where the right rear detection electrode 33 on the driver's side detects the operation finger during closing the rear window 84*a* on the front passenger side.

Based on the control pattern information 50, the control unit 6 invalidates the invalidates the detection of the operation finger by the right rear detection electrode 33 which is turned "ON" during driving. Then, the control unit 6 outputs the operation signal $S_{8d}$ until the left rear detection electrode 34 is turned "OFF" or the switch 43 is turned "OFF".

In the case of the seventh control pattern in the manual mode, the control unit 6 invalidates the detection of the operation finger by the other detection electrode during driving, and outputs the operation signal $S_8$ to drive the window until the switch is turned "OFF" or until the detection electrode which detected the operation finger first is turned "OFF". Meanwhile, in the automatic mode, once the automatic mode is determined, the control unit 6 outputs the operation signal $S_8$ to instruct to fully open or fully close the window corresponding to the detection electrode which detected the operating finger.

Eighth Control Pattern

Figure 7B:
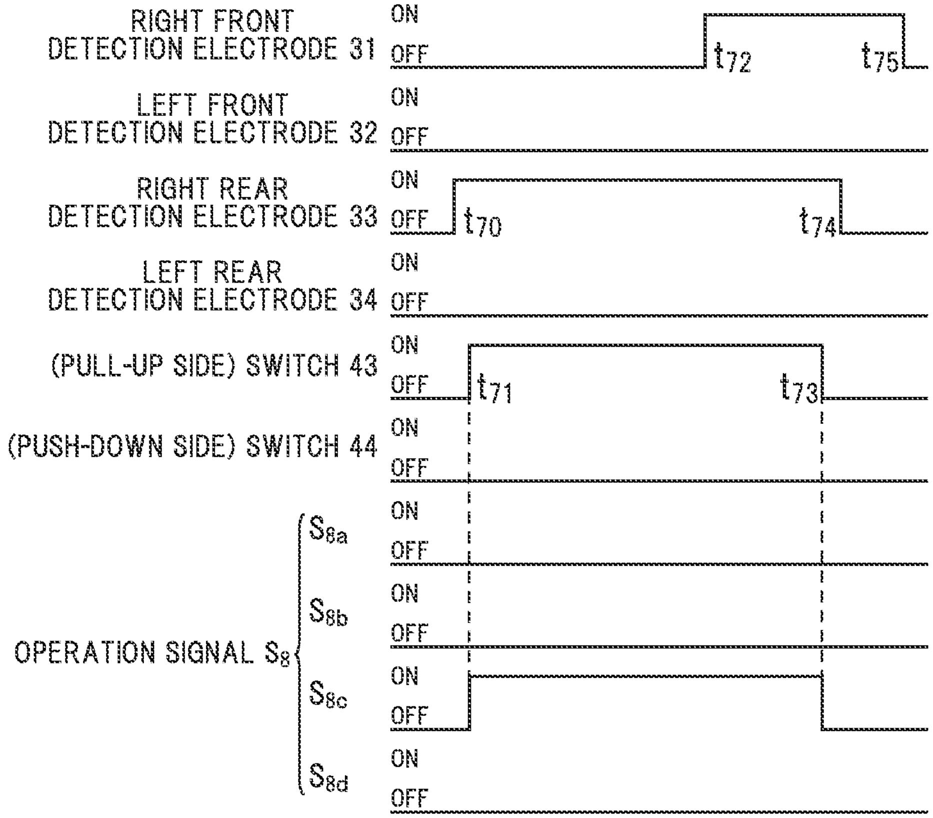
FIG. 7B is an explanatory diagram illustrating an eighth control pattern of the operation device in the embodiment.

FIG. 7B is an example of a timing chart of the eighth control pattern in which "ON" of the switch is confirmed after the detection electrode of the rear-end operation region 23 is turned "ON" and the detection electrode of the front-end operation region 21 is then turned "ON".

In FIG. 7B, the right rear detection electrode 33 is "ON" from time $t_{70}$ to time $t_{74}$, the right front detection electrode 31 is "ON" from time $t_{72}$ to time $t_{75}$, and the pull-up side switch 43 is "ON" from time $t_{71}$ to time $t_{73}$.

In FIG. 7B, the right front detection electrode 31 at the front on the driver side is turned "ON" during closing of the rear window 83*a* on the driver side. When the switch is turned "ON" in a state in which the front-end operation region 21 and the rear-end operation region 23 are both "ON", "ON" of the rear-end operation region 23 is invalidated. However, in the eighth control pattern, "ON" of the detection electrode of the front-end operation region 21 is not prioritized and is invalidated if it is turned "ON" during when the window corresponding to the detection electrode of the rear-end operation region 23 which is "ON" is being driven.

During driving, even if the right front detection electrode 31 is turned "ON", the control unit 6 invalidates this operation based on the control pattern information 50. Then, the control unit 6 outputs the operation signal $S_{8c}$ until the right rear detection electrode 33 is turned "OFF" or the switch 43 is turned "OFF".

In the case of the eighth control pattern in the manual mode, the control unit 6 invalidates the detection of the operation finger by the detection electrode during driving, and outputs the operation signal $S_8$ to drive the window until the switch is turned "OFF" or until the detection electrode which detected the operation finger first is turned "OFF". Meanwhile, in the automatic mode, once the automatic mode is determined, the control unit 6 outputs the operation signal $S_8$ to instruct to fully open or fully close the window corresponding to the detection electrode which detected the operating finger.

Figure 8:
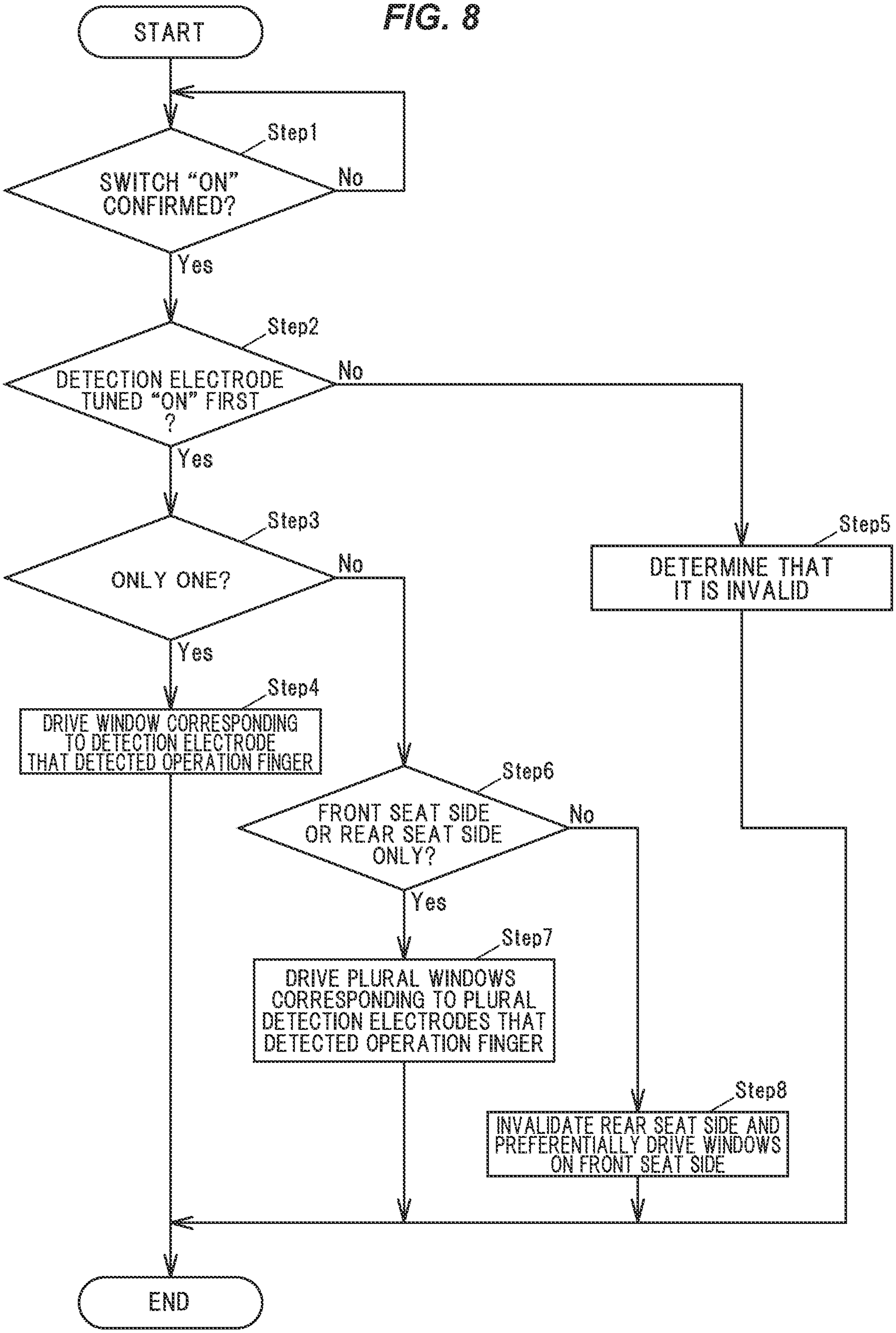
FIG. 8 is a flowchart showing an operation of the operation device in the embodiment.

An example of an operation of the operation device 1 in the present embodiment will be described with reference to the flowchart of FIG. 8. Next, an example of an operation until start driving will be described.

(Operation)

The control unit 6 of the operation device 1 acquires the detection signal $S_5$ from the contact detection unit 3 and the switch signal $S_6$ and the switch signal $S_7$ from the operation detection unit 4. When it is "Yes" in Step 1, i.e., when "ON" of the switch is confirmed (Step 1: Yes), the control unit 6 checks if any detection electrode is "ON" at the time the confirmation is made.

When the detection electrode is "ON" at the time the confirmation is made (Step 2: Yes) and when there is only one detection electrode which is "ON" (Step 3: Yes), the control unit 6 drives the window corresponding to the detection electrode which detected the operation finger (Step 4), based on the control pattern information 50. This driving of the window is performed by outputting the operation signal $S_8$ to the window driving device 85 and is stopped when the driven window is fully opened or fully closed, or when the detection electrode is turned from "ON" to "OFF" or the switch is turned from "ON" to "OFF".

Meanwhile, when, in Step 2, the detection electrodes are "OFF" at the time "ON" of the switch is confirmed (Step 2: No), the control unit 6 determines that this operation is invalid based on the control pattern information 50, and ends the operation (Step 5).

Meanwhile, when there are plural detection electrodes which detected the operation finger in Step 3 (Step 3: No) and also when these detection electrodes are located only on the front seat side (in the front-end operation region 21) or only on the rear seat side (in the rear-end operation region 23) (Step 6: Yes), the control unit 6 drives plural windows corresponding to the plural detection electrodes which detected the operation finger (Step 7), based on the control pattern information 50.

Meanwhile, when the detection electrodes which detected the operation finger are located both on the front seat side (in the front-end operation region 21) and on the rear seat side (in the rear-end operation region 23) in Step 6 (Step 6: No), the control unit 6 invalidates the rear seat side (the rear-end operation region 23) and preferentially drives the window on the front seat side (the front-end operation region 21). As a modification, when the detection electrodes which detected the operation finger are located both on the front seat side (in the front-end operation region 21) and on the rear seat side (in the rear-end operation region 23) (Step 6: No), the control unit 6 invalidates both the front seat side (the front-end operation region 21) and the rear seat side (the rear-end operation region 23).

Effects of the Embodiment

The operation device 1 in the present embodiment can suppress erroneous determination against intention of the user. For example, when the user performs a pull-up operation or a push-down operation on the front-end operation region 21, the operation may be determined by proximity or contact of the pulp portion 91 of the operation finger 9 to/with the rear-end operation region 23, resulting in driving an unintended window which corresponds to the rear-end operation region 23. The operation device 1 assumes such erroneous determination and prioritizes the front-end operation region 21 when the detection electrodes of the front-end operation region 21 and the rear-end operation region 23 are "ON" at the time "ON" of the switch is confirmed. Therefore, it is possible to suppress erroneous determination against intention of the user, as compared to when such a configuration is not adopted.

The operation device 1 can instruct to open and close the windows 81*a*-84*a* by one operation knob 2 and is thus small in size as compared to when four operation knobs are provided. Since the operation knob 2 is small in size, the operation device 1 may detect contact with the rear-end operation region 23 which is not intended by the user. However, when the operation finger is detected in the front-end operation region 21 and the rear-end operation region 23, the operation performed on the front-end operation region 21 is determined to be valid and the operation performed on the rear-end operation region 23 is determined to be invalid. Therefore, the operation device 1 can suppress erroneous determination against intention of the user as compared to when such a configuration is not adopted.

The operation device 1 makes determination while taking into consideration the delay in the processing of the contact detection unit 3 and thus can make determination with high accuracy as compared to when determination is made at the time the switch is turned "ON".

Although some embodiment and modifications of the invention have been described, these embodiment and modifications are merely an example and the invention according to claims is not to be limited thereto. These new embodiment and modifications thereof may be implemented in various other forms, and various omissions, substitutions and changes, etc., can be made without departing from the gist of the invention. In addition, not all combinations of the features described in these embodiment and modifications are necessary to solve the problem of the invention. Further, these embodiment and modifications thereof are included within the scope and gist of the invention and also within the invention described in the claims and the range of equivalency.

REFERENCE SIGNS LIST

1 OPERATION DEVICE
2 OPERATION KNOB
3 CONTACT DETECTION UNIT
4 OPERATION DETECTION UNIT
5 STORAGE UNIT
6 CONTROL UNIT
8 VEHICLE
9 OPERATION FINGER
21 FRONT-END OPERATION REGION
21*a* FIRST OPERATION REGION
21*b* SECOND OPERATION REGION
23 REAR-END OPERATION REGION
23*a* THIRD OPERATION REGION
23*b* FOURTH OPERATION REGION
26 SHAFT
30 SUB-SUBSTRATE
31 RIGHT FRONT DETECTION ELECTRODE
32 LEFT FRONT DETECTION ELECTRODE
33 RIGHT REAR DETECTION ELECTRODE
34 LEFT REAR DETECTION ELECTRODE
35 SENSOR CONTROL UNIT
43, 44 SWITCH
50 CONTROL PATTERN INFORMATION
81*a*-84*a* WINDOW
85 WINDOW DRIVING DEVICE
350 ELECTROSTATIC THRESHOLD VALUE

The invention claimed is:

1. An operation device, comprising:

an operation knob that is operable by a pull-up operation and a push-down operation about a shaft and comprises a front-end operation region on a front-end side far from the shaft and a rear-end operation region on a rear end side close to the shaft;

a contact detection unit to detect contact of a user with the front-end operation region and the rear-end operation region;

an operation detection unit to detect the pull-up operation and the push-down operation performed on the operation knob; and a determination unit that determines an operation performed by combining contact with the front-end operation region and the rear-end operation region detected by the contact detection unit and the pull-up operation and the push-down operation detected by the operation detection unit, and also determines that at least an operation performed on the rear-end operation region is invalid when contact with the front-end operation region and the rear-end operation region is detected.

2. The operation device according to claim 1, wherein when contact with the front-end operation region and the rear-end operation region is detected, the determination unit determines that operations on the front-end operation region and the rear-end operation region are invalid.

3. The operation device according to claim 1, wherein when contact with the front-end operation region and the rear-end operation region is detected, the determination unit determines that the pull-up operation and the push-down operation performed on the front-end operation region are valid.

4. The operation device according to claim 1, wherein the determination unit performs determination of the operation with a predetermined delay from the time at which the pull-up operation and the push-down operation are detected.

5. The operation device according to claim 1, further comprising:

an operation signal generation unit that generates an operation signal based on the operation determined by the determination unit.

6. The operation device according to claim 1, wherein the operation signal generation unit generates the operation signal until the pull-up operation and the push-down operation stop being detected or until contact with the front-end operation region and the rear-end operation region stops being detected.

7. The operation device according to claim 1, further comprising:

a storage unit that stores pattern information comprising combinations of contact with the front-end operation region and the rear-end operation region, timings of the pull-up operation and the push-down operation, an operation signal, and validity and invalidity of the operation, wherein the determination unit determines the operation based on the pattern information, and wherein the operation signal generation unit generates, based on the pattern information, the operation signal corresponding to the operation determined by the determination unit.

8. The operation device according to claim 1, wherein the front-end operation region comprises a first operation region and a second operation region to instruct to open and close front right and left windows of a vehicle, and wherein the rear-end operation region comprises a third operation region and a fourth operation region to instruct to open and close rear right and left windows of the vehicle.

9. The operation device according to claim 8, wherein the contact detection unit comprises first to fourth detection electrodes arranged in the first to fourth operation regions and a contact determination unit to determine proximity and contact of a detection target based on output signals acquired from the first to fourth detection electrodes, wherein the contact determination unit is arranged on a substrate, and wherein the substrate is arranged in the operation knob.

10. The operation device according to claim 9, wherein when capacitance generated between the detection target and the first to fourth detection electrodes becomes not less than a predetermined value, the contact determination unit determines that there is proximity or contact of the detection target.

* * * * *